United States Patent
Xin

(10) Patent No.: US 9,497,394 B2
(45) Date of Patent: Nov. 15, 2016

(54) THERMAL IMAGING DEVICE, THERMAL IMAGING METHOD AND THERMAL IMAGING CONTROL SYSTEM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yang Xin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 586 days.

(21) Appl. No.: 13/870,950

(22) Filed: Apr. 25, 2013

(65) Prior Publication Data
US 2013/0286190 A1    Oct. 31, 2013

(30) Foreign Application Priority Data
Apr. 27, 2012 (CN) .......................... 2012 1 01274936

(51) Int. Cl.
*H04N 5/33* (2006.01)
*G06K 9/20* (2006.01)
*G06T 7/00* (2006.01)

(52) U.S. Cl.
CPC .............. *H04N 5/33* (2013.01); *G06K 9/2018* (2013.01); *G06T 7/001* (2013.01); *G06K 2209/19* (2013.01); *G06T 2207/10048* (2013.01); *G06T 2207/30141* (2013.01)

(58) Field of Classification Search
CPC ......................................................... H04N 5/33
USPC ......................................................... 348/126
See application file for complete search history.

(56) References Cited

U.S. PATENT DOCUMENTS

| | | | | |
|---|---|---|---|---|
| 5,440,566 A * | 8/1995 | Spence | ............... | G01R 31/309 356/394 |
| 6,515,494 B1 * | 2/2003 | Low | .................... | G01N 21/9501 324/501 |
| 6,758,403 B1 * | 7/2004 | Keys | .................... | G06K 7/0008 235/462.45 |
| 2009/0009595 A1 * | 1/2009 | Ishiwata | ............ | A61B 1/00165 348/68 |

* cited by examiner

*Primary Examiner* — Michael Lee
*Assistant Examiner* — Justin Sanders
(74) *Attorney, Agent, or Firm* — Zhigang Ma

(57) ABSTRACT

A thermal imaging device includes an optical module gathering infrared radiation of a circuit board and correspondingly providing infrared light, a photo sensor converting the infrared light into a first electrical signal, a processor, and a thermal imaging control system having one or more programs stored in a storage and executed by the processor. The system includes an image processing unit converting the first electrical signal into a thermal image signal, a comparing unit comparing the thermal image signal with circuit diagram of the circuit board to determine at least one abnormal temperature element, and a display control unit controlling a screen to display a thermal image of the circuit board together with a label comprising at least one name of the at least one abnormal temperature element on the screen.

10 Claims, 5 Drawing Sheets

THERMAL IMAGING DEVICE, THERMAL IMAGING METHOD AND THERMAL IMAGING CONTROL SYSTEM

BACKGROUND

1. Technical Field

The present disclosure relates to a thermal imaging device, a thermal imaging method and a thermal imaging control system.

2. Description of Related Art

Thermal imaging devices, such as thermal imaging cameras, can be used to check abnormal temperature on printed circuit boards. However, existing thermal imaging devices just show a thermal image with abnormal temperature regions. The specific components or elements having the abnormal temperature may not be displayed on the screen showing the abnormal temperature region, accordingly, users further need to locate the abnormal temperature elements or elements on circuit diagrams of the printed circuit boards according to the thermal image, which may be inconvenient for users.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

In general, the word "module" and "unit", as used herein, refers to logic embodied in hardware or firmware, or to a recording of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

Figure 1:
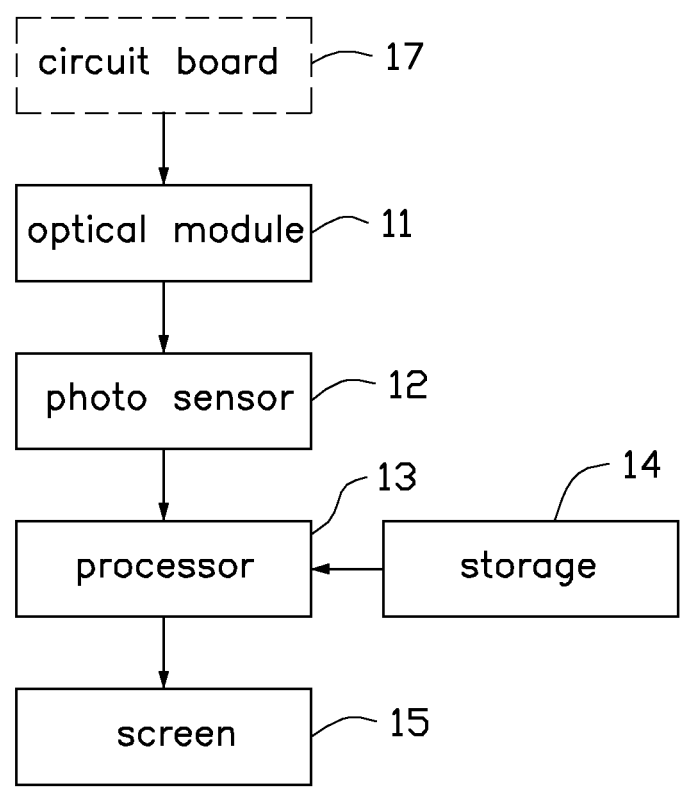
FIG. 1 is a block diagram of a thermal imaging device according to an embodiment of the present disclosure.

Referring to FIG. 1, a block diagram of a thermal imaging device 10 according to an embodiment of the present disclosure is shown. The thermal imaging device 10 may be a thermal imaging camera, and includes an optical module 11, a photo sensor 12, a processor 13, a storage 14, and a screen 15. The optical module 11 gathers infrared radiation emitted by a circuit board 17 and provides the infrared light to the photo sensor 12. The photo sensor 12 converts the infrared light into a first electrical signal and provides the first electrical signal to the processor 13. The circuit board 17 can be a printed circuit board (PCB) of a mobile phone or a main board of a computer.

Figure 2:
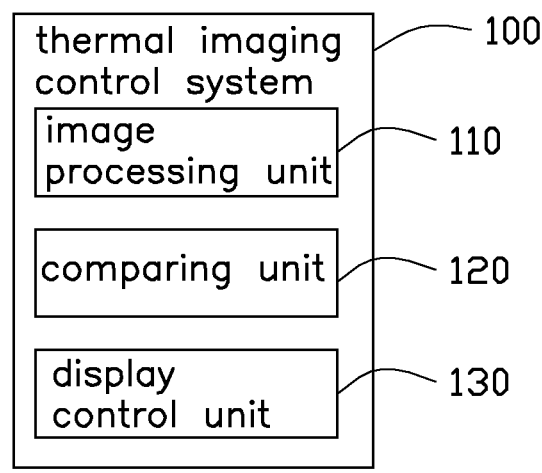
FIG. 2 is a block diagram of a thermal imaging control system according to an embodiment of the present disclosure.

Also referring to FIG. 2, a thermal imaging control system 100 having one or more programs is stored in the storage 14 and executed by the processor 13. The system 100 includes an image processing unit 110, a comparing unit 120, and a display control unit 130. The comparing unit 120 compares the thermal image signal with circuit diagram of the circuit board 17 to determine at least one abnormal temperature element. The display control unit 130 controls the screen 15 to display a thermal image of the circuit board 17 together with a label comprising at least one name of the at least one abnormal temperature element on the screen 15. The abnormal temperature element is at least one element with a higher temperature than other elements of the circuit board 17.

In one embodiment, the comparing unit 120 further determines a branch of the PCB where the at least one abnormal temperature element is located. The display control unit 130 further controls the screen 15 to display or highlight the branch on the thermal image of the circuit board 17.

Figure 3:
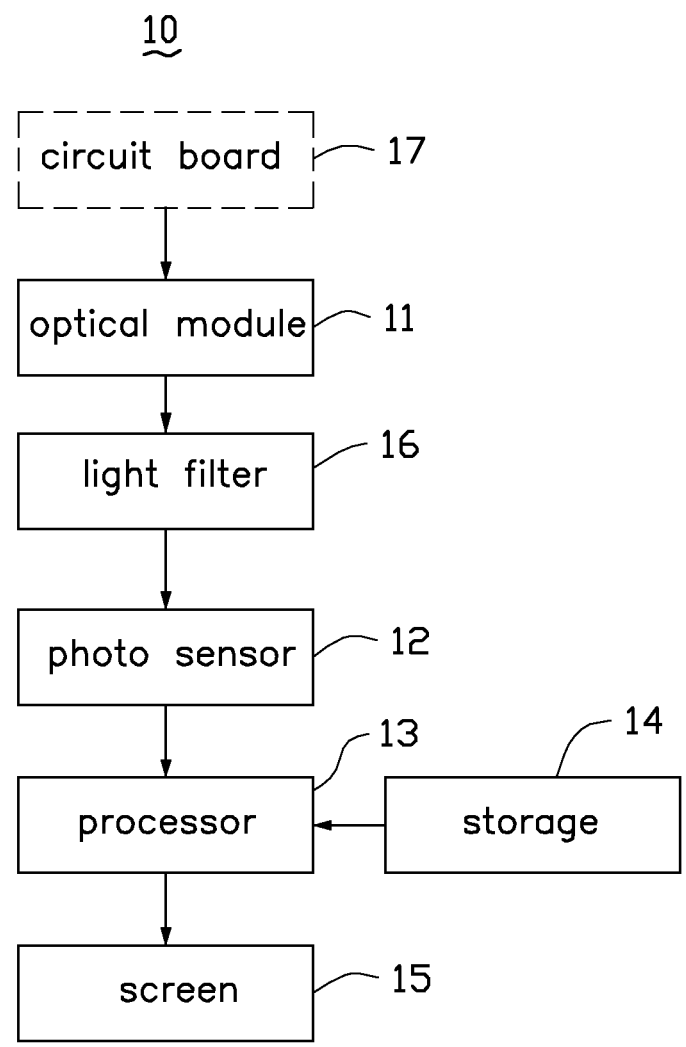
FIG. 3 is a block diagram of the thermal imaging device of FIG. 1 including a detachable light filter.

In one embodiment, the optical module 11 gathers visible light reflected by the circuit board 17 and provides the visible light to the photo sensor 12, and the photo sensor 12 further converts the visible light into a second electrical signal and provides the second electrical signal to the processor 13. Referring to FIG. 3, the thermal imaging device 10 may further includes a detachable light filter 16 positioned between the optical module 11 and the photo sensor 12. The optical module 11 provides infrared light only because of the light filter 16, and when the light filter 16 is detached, the optical module 11 provides visible light including visible light to the photo sensor 12 such that the photo sensor 12 converts all the light including visible light into the second electrical signal. In an alternatively embodiment, the optical module 11 may include an infrared optical element for gathering the infrared light emitted by the circuit board 17 and a visible optical element for gathering the visible light reflected by the circuit board 17.

Figure 4:
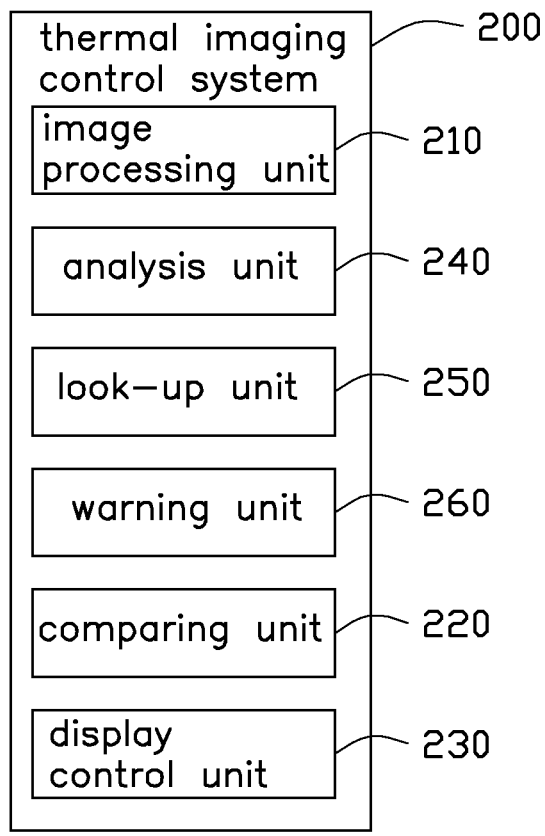
FIG. 4 is a block diagram of a thermal imaging control system according to an alternative embodiment of the present disclosure.

Referring to FIG. 4, a block diagram of a thermal imaging control system 200 according to an alternative embodiment of the present disclosure is shown. The thermal imaging control system 200, in addition to having all the elements of the thermal imaging control system 100, further comprises an analysis unit 240, a look-up unit 250, and a warning unit 260. The image processing unit 210 further converts the second electrical signal into image data. The analysis unit 240 analyzes the image data to obtain a shape, a size, and a location of at least one element of the circuit board 17. The shape, the size, and the location of at least one element of the circuit board 17 define detection information of the circuit board 17. The look-up unit 250 looks up the circuit diagram of the circuit board 17 in the storage 14 according to the detection information of the circuit board 17, then, the comparing unit 220 can compare the thermal image signal with the circuit diagram of the circuit board 17 which is looked up by the look-up unit 250 to determine the presence of (if any) at least one abnormal temperature element. The warning unit 160 sends a warning to a user when the look-up unit 150 fails to find one corresponding circuit diagram of the circuit board 17 from the storage 14.

In the alternative embodiment, the storage 14 may further store a plurality of Gerber® files of a plurality of circuit boards, and each Gerber® file includes reference information and circuit diagrams corresponding to the reference information. The reference information includes a reference shape, a reference size, and a reference location of the at least one element of the circuit board 17. The look-up unit 150 looks up the circuit diagram of the circuit board 17 in the storage 14 by comparing the detection information with the reference information. When the detection information matches or corresponds to the reference information or part of the reference information, the circuit diagram corresponding to the reference information is made to serve as the circuit diagram pertaining to the circuit board 17.

Figure 5:
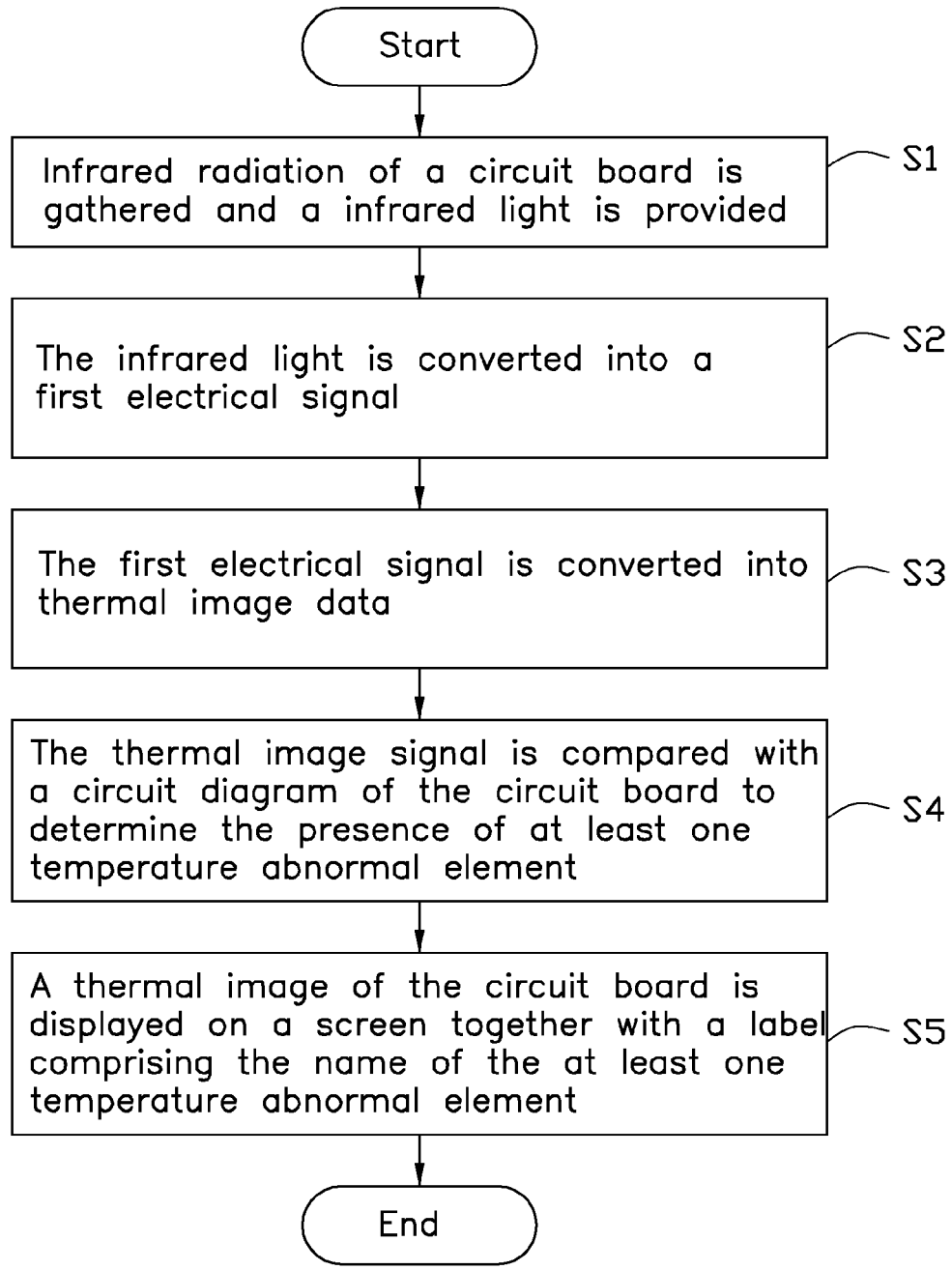
FIG. 5 is a flowchart of a thermal imaging method according to an embodiment of the present disclosure.

Referring to FIG. 5, a flowchart of a thermal imaging method according to an embodiment of the present disclosure is shown. The method can be implemented in the thermal imaging device 10 of FIG. 1 via the thermal imaging control system 100 of FIG. 3, and includes:

Step S1, infrared radiation of a circuit board 17 is gathered and a infrared light is provided by the optical module 11.

In this step, visible light reflected by the circuit board 17 is further gathered.

Step S2, the infrared light is converted into a first electrical signal by the photo sensor 12.

Also, the visible light gathered is converted into a second electrical signal by the photo sensor 12. The first electrical signal and the second electrical signal are provided to the processor 13.

Step S3, the first electrical signal is converted into thermal image data by the image processing unit 110 or 210.

The second electrical signal is also converted into image data by the image processing unit 110.

Step S4, the thermal image signal is compared with a circuit diagram of the circuit board 17 to determine the presence of (if any) at least one abnormal temperature element, by the comparing unit 120 or 220.

In step S4, detection information in relation to the circuit board 17 including a shape, a size, and a location of at least one element of the circuit board 17 is obtained, by analyzing the image data of the visible light via the analysis unit 240. The storage 14 further stores a plurality of Gerber® files each including reference information and circuit diagrams corresponding to the reference information. The reference information includes a reference shape, a reference size, and a reference location of the at least one element. The look-up unit 250 looks up the circuit diagram of the circuit board 17 in the storage 14 by comparing the detection information with the reference information. When the detection information matches with the reference information, a circuit diagram corresponding to the reference information is made to serve as the circuit diagram of the circuit board 17 by the look-up unit 250, then, the thermal image data can be compared with the circuit diagram of the circuit board 17 to determine the identity and name of at least one abnormal temperature element.

Moreover, in step S4, a branch which includes the at least one abnormal temperature element is located is determined by the comparing unit 220, and a warning is sent to a user by the warning unit 260 when the look-up unit 250 fails to find one corresponding circuit diagram of the circuit board 17.

Step S5, a thermal image of the circuit board 17 is displayed on a screen 15 together with a label comprising the name of the at least one abnormal temperature element under the control of the display control unit 130 or 230.

In step S5, when the branch containing the at least one abnormal temperature element is further determined by the comparing unit 220, the particular containing branch on the thermal image of the circuit board 17 is further displayed or highlighted on the screen 15.

The name of the abnormal temperature element is labeled on the screen 15 of the thermal imaging device 10, the users do not need to find the abnormal temperature elements by themselves, which increases the convenience.

It is to be further understood that even though numerous characteristics and advantages of preferred and exemplary embodiments have been set out in the foregoing description, together with details of the structures and functions of the embodiments, the disclosure is illustrative only; and changes may be made in detail, especially in the matters of shape, size and arrangement of parts within the principles of the present disclosure to the full extent indicated by the broad general meaning of the terms in which the appended claims are expressed.

What is claimed is:

1. A thermal imaging device, comprising:
    an optical module gathering infrared radiation of a circuit board and correspondingly outputting infrared light;
    a photo sensor converting the infrared light into a first electrical signal;
    a processor; and
    a thermal imaging control system having one or more programs stored in a storage and executed by the processor, the system comprising:
    an image processing unit converting the first electrical signal into a thermal image signal;
    a comparing unit comparing the thermal image signal with a circuit diagram of the circuit board to determine at least one abnormal temperature element; and
    a display control unit controlling a screen to display a thermal image of the circuit board together with a label comprising at least one name of the at least one abnormal temperature element on the screen;
    wherein the system further comprises an analysis unit and a look-up unit, the optical module further gathers visible light reflected by the circuit board and provides visible light, the photo sensor further converts the provided visible light into a second electrical signal, the image processing unit further converts the second electrical signal into image data, the analysis unit analyzes the image data to obtain detection information including a shape, a size, and a location of at least one element of the circuit board, the look-up unit looks up the circuit diagram of the circuit board in the storage according to the detection information such that the comparing unit compares the thermal image signal with the circuit diagram of the circuit board to determine the at least one abnormal temperature element.

2. The thermal imaging device of claim 1, wherein an open two-dimensional binary vector image format file is stored in the storage, and comprises reference information and the circuit diagram corresponding to the reference information, the reference information comprising a reference shape, a reference size, and a reference location of the at least one element, the look-up unit looking up the circuit diagram of the circuit board in the storage by comparing the detection information with the reference information.

3. The thermal imaging device of claim 1, wherein the thermal imaging control system further comprises a warning unit sending a warning to a user when the look-up unit fails to find one corresponding circuit diagram of the circuit board.

4. The thermal imaging device of claim 1, further comprising a detachable light filter positioned between the optical module and the photo sensor, wherein the optical module provides the infrared light via the light filter, and when the light filter is detached, the optical module provides all light including the visible light to the photo sensor, and the photo sensor converts the visible light into the second electrical signal.

5. A thermal imaging method, comprising:
   detecting infrared radiation of a circuit board and providing infrared light;
   converting the infrared light into a first electrical signal;
   converting the first electrical signal into a thermal image signal;
   comparing the thermal image signal with circuit diagram of the circuit board to determine at least one abnormal temperature element; and
   displaying a thermal image of the circuit board together with a label comprising at least one name of the at least one abnormal temperature element on a screen which displays the thermal image;
   wherein the thermal imaging method further comprises:
   detecting visible light reflected by the circuit board;
   converting the visible light into a second electrical signal;
   converting the second electrical signal into image data,
   analyzing the image data to obtain detection information including a shape, a size, and a location of at least one element of the circuit board; and
   looking up the circuit diagram of the circuit board according to the detection information such that the thermal image signal is compared with the circuit diagram of the circuit board to determine the at least one abnormal temperature element.

6. The thermal imaging method of claim 5, further comprising:
   comparing the detection information with reference information of an open two-dimensional binary vector image format file is stored in a storage to look up the circuit diagram of the circuit board, the reference information including a reference shape, a reference size, and a reference location of the at least one element, the open two-dimensional binary vector image format file further comprising the circuit diagram corresponding to the reference information.

7. The thermal imaging method of claim 5, further comprising:
   sending a warning to a user when the look-up unit fails to find the circuit diagram of the circuit board.

8. A thermal imaging control system, comprising:
   an image processing unit converting a first electrical signal corresponding to an infrared radiation of a circuit board into a thermal image signal;
   a comparing unit comparing the thermal image signal with circuit diagram of the circuit board to determine at least one abnormal temperature element; and
   a display control unit controlling a screen to display a thermal image of the circuit board and labeled at least one name of the at least one abnormal temperature element on the screen;
   wherein the thermal imaging control system further comprises an analysis unit and a look-up unit, the photo sensor further converts visible light reflected by the circuit board into a second electrical signal, the image processing unit further converts the second electrical signal into image data, the analysis unit analyzes the image data to obtain detection information including a shape, a size, and a location of at least one element of the circuit board, the look-up unit looks up the circuit diagram of the circuit board in the storage according to the detection information such that the comparing unit compares the thermal image signal with the circuit diagram of the circuit board to determine the at least one abnormal temperature element.

9. The thermal imaging control system of claim 8, wherein an open two-dimensional binary vector image format file is stored in a storage, and comprises reference information and the circuit diagram corresponding to the reference information, the reference information comprising a reference shape, a reference size, and a reference location of the at least one element, the look-up unit looking up the circuit diagram of the circuit board in the storage by comparing the detection information with the reference information.

10. The thermal imaging control system of claim 8, further comprising a warning unit sending a warning to a user when the look-up unit fails to find one corresponding circuit diagram of the circuit board.

* * * * *